(12) United States Patent
Furukawa et al.

(10) Patent No.: US 10,289,358 B2
(45) Date of Patent: May 14, 2019

(54) IMAGE FORMING APPARATUS THAT IMPROVES FCOT

(71) Applicant: CANON KABUSHIKI KAISHA, Tokyo (JP)

(72) Inventors: Masato Furukawa, Nagareyama (JP); Satoshi Seki, Abiko (JP); Yohei Katto, Nagareyama (JP); Akiko Kanno, Kashiwa (JP); Hidenori Sunada, Abiko (JP); Asahiro Nakayoshi, Matsudo (JP); Seiji Shibaki, Abiko (JP); Kaoru Hamada, Nagareyama (JP); Yumeng Zhang, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/245,592

(22) Filed: Aug. 24, 2016

(65) Prior Publication Data
US 2017/0060493 A1 Mar. 2, 2017

(30) Foreign Application Priority Data
Aug. 28, 2015 (JP) .................. 2015-169179

(51) Int. Cl.
*G06F 3/12* (2006.01)
*H04N 1/23* (2006.01)
(Continued)

(52) U.S. Cl.
CPC ......... *G06F 3/1215* (2013.01); *G03G 15/234* (2013.01); *G03G 15/24* (2013.01);
(Continued)

(58) Field of Classification Search
CPC ...... G03G 15/234; G03G 15/24; G03G 15/50; G03G 15/602; G03G 21/14; G06F 3/1215;
(Continued)

(56) References Cited

U.S. PATENT DOCUMENTS 5,265,209 A * 11/1993 Kageyama ............ G06F 3/1295
358/1.17
5,751,438 A * 5/1998 Murai ..................... H04N 1/203
358/400
(Continued)

FOREIGN PATENT DOCUMENTS

| CN | 1761566 A | 4/2006 |
| CN | 1777229 A | 5/2006 |
| JP | 2000280580 A | 10/2000 |

OTHER PUBLICATIONS

Extended European Search Report issued in European Appln. No. 16185852.7 dated Jan. 30, 2017.
(Continued)

*Primary Examiner* — Chad Dickerson
(74) *Attorney, Agent, or Firm* — Rossi, Kimms & McDowell LLP

(57) ABSTRACT

An image forming apparatus which is capable of reading an original, temporarily storing image data in a storage unit, and then transferring the image data to an image forming unit to improve FCOT in forming an image. A memory stores image data output from image reading units. An image forming unit forms an image on a recording medium based on the image data stored in the memory. A first memory output frequency in a first mode in which one side of an original is read and an image is formed on one side of a recording medium is lower than a second memory output
(Continued)

frequency in a second mode in which both sides of an original are read and an image is formed both sides of a recording medium.

9 Claims, 13 Drawing Sheets

(51) Int. Cl.
  *H04N 1/00* (2006.01)
  *G03G 15/23* (2006.01)
  *G03G 15/24* (2006.01)
  *G03G 15/00* (2006.01)
  *G03G 21/14* (2006.01)
  *H04N 1/21* (2006.01)

(52) U.S. Cl.
  CPC ............ *G03G 15/50* (2013.01); *G03G 15/602* (2013.01); *G03G 21/14* (2013.01); *G06F 3/1221* (2013.01); *H04N 1/00891* (2013.01); *H04N 1/00931* (2013.01); *H04N 1/2104* (2013.01); *H04N 1/2323* (2013.01); *H04N 2201/0094* (2013.01)

(58) Field of Classification Search
  CPC .............. G06F 3/1221; H04N 1/00891; H04N 1/00931; H04N 1/2104; H04N 1/2323
  USPC ...... 358/1.11–1.18, 1.9, 2.1, 3.23, 3.24, 412, 358/409, 426.05; 711/167–169
  See application file for complete search history.

(56) References Cited

U.S. PATENT DOCUMENTS

| | | | |
|---|---|---|---|
| 6,043,897 A * | 3/2000 | Morikawa | H04N 1/00954 348/27 |
| 8,477,387 B2 | 7/2013 | Shiraishi | |
| 2001/0012132 A1* | 8/2001 | Kaji | H04N 1/00795 358/474 |
| 2003/0048492 A1 | 3/2003 | Maeda et al. | |
| 2004/0125394 A1* | 7/2004 | Terao | B41J 11/003 358/1.13 |
| 2004/0190084 A1 | 9/2004 | Shirai | |
| 2007/0133065 A1* | 6/2007 | Okano | H04N 1/00928 358/441 |
| 2008/0180765 A1* | 7/2008 | Nakashita | H04N 1/00933 358/498 |
| 2009/0116081 A1* | 5/2009 | Kasai | H04N 1/00588 358/498 |
| 2009/0231638 A1* | 9/2009 | Umezawa | H04N 1/0071 358/474 |
| 2009/0317120 A1* | 12/2009 | Miyahara | G03G 15/234 399/82 |
| 2010/0328715 A1* | 12/2010 | Hara | G06F 3/1213 358/1.15 |
| 2012/0033987 A1* | 2/2012 | Ikegami | G03G 15/5029 399/82 |
| 2014/0063561 A1 | 3/2014 | Endoh | |

OTHER PUBLICATIONS

Office Action issued in Chinese Application No. 201610739801.9 dated Sep. 10, 2018. English translation provided.

* cited by examiner

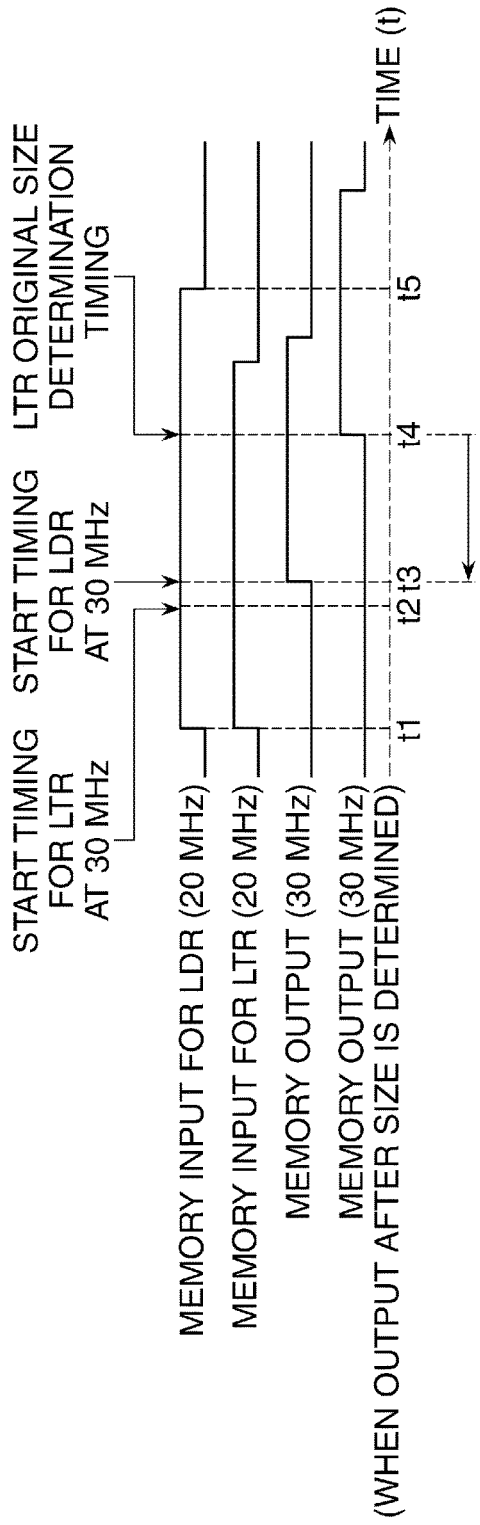

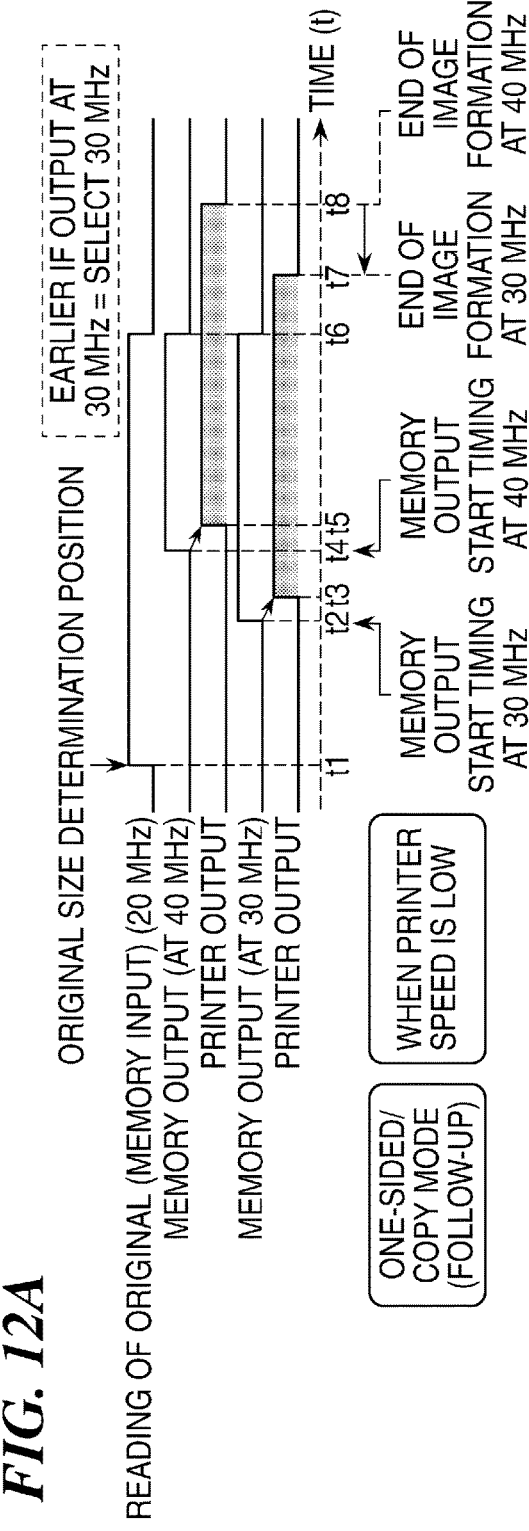
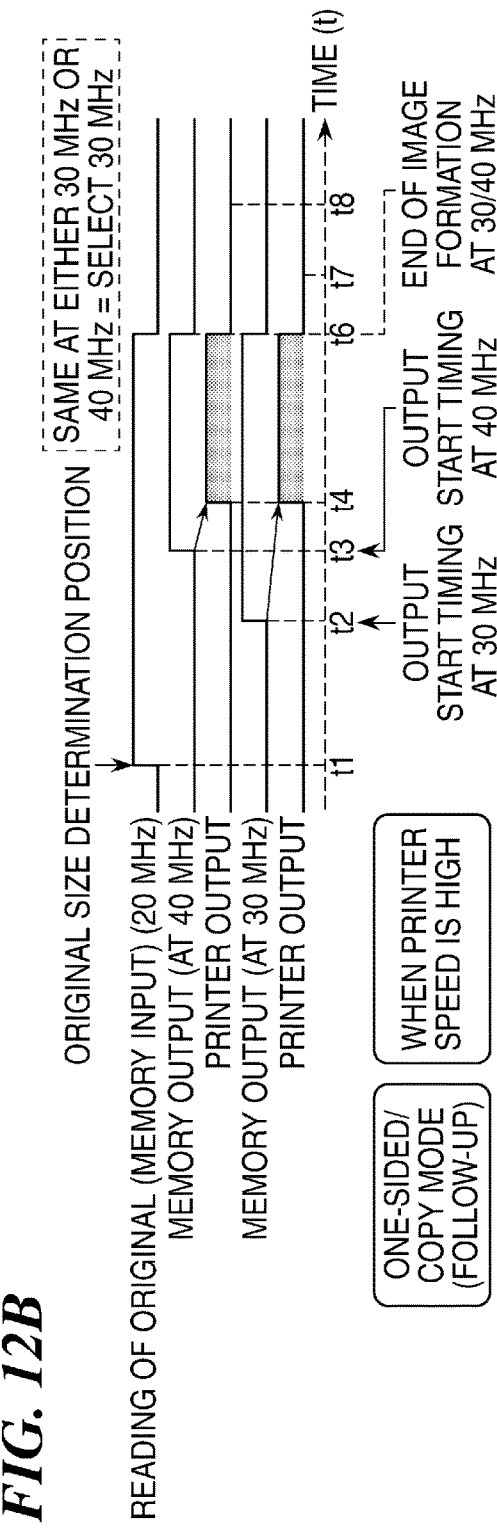
FIG. 12A
FIG. 12B

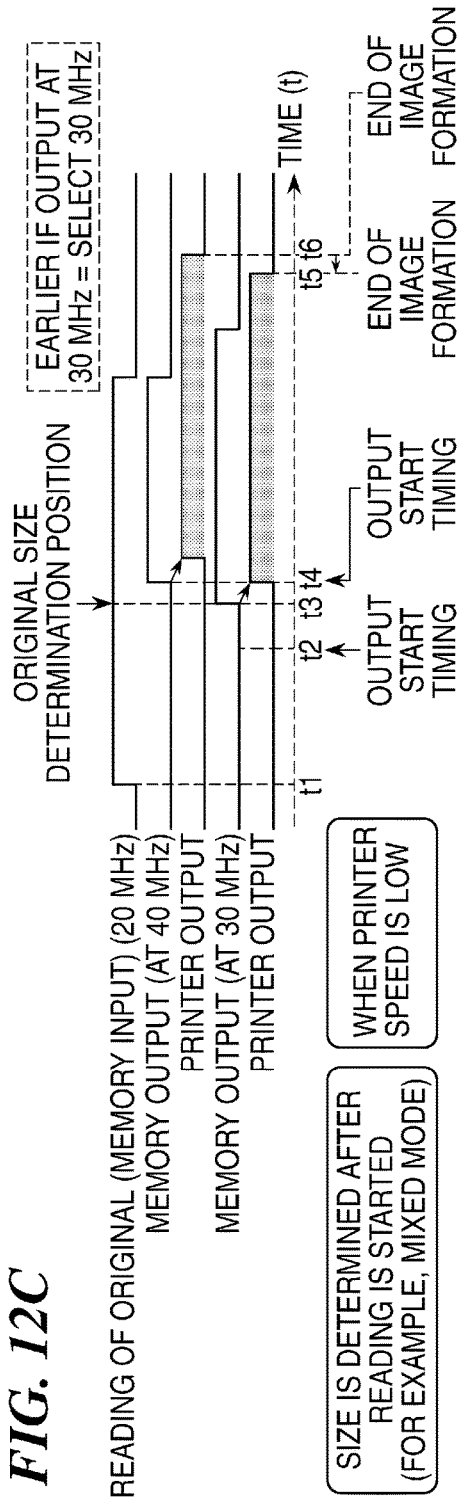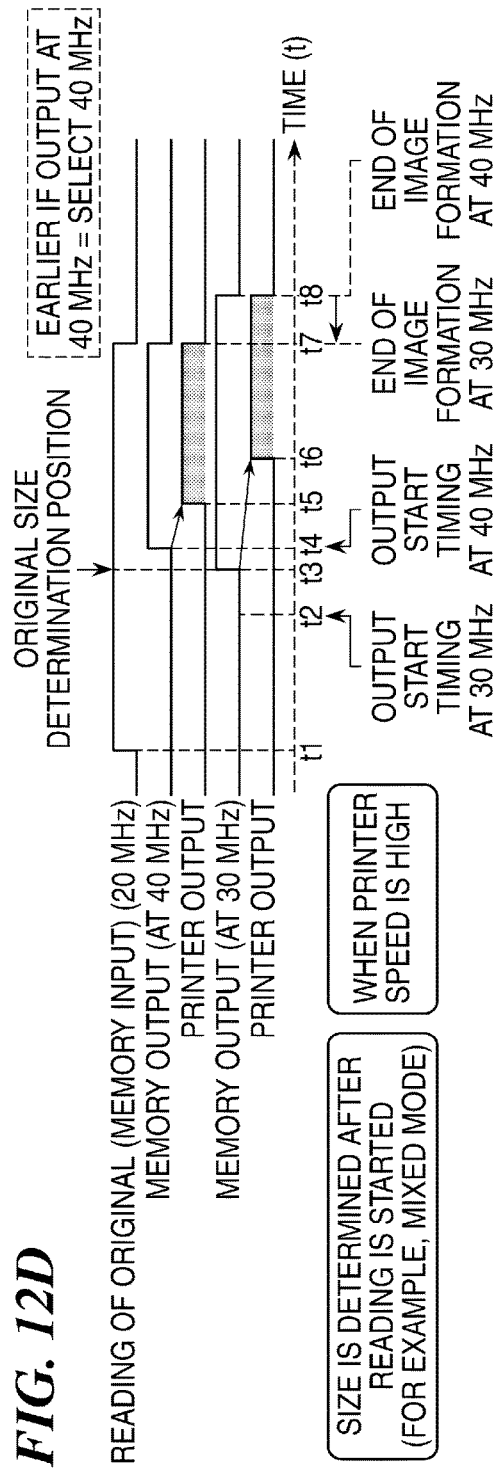

*FIG. 13*

| OPERATING MODE / SIZE OF ORIGINAL | | REGULAR SIZE | IRREGULAR SIZE |
|---|---|---|---|
| ONE-SIDED | COPY | 30 | DEPENDING ON CONDITIONS |
| | SEND | 40 | 40 |
| DOUBLE-SIDED | COPY | 40 | 40 |
| | SEND | 40 | 40 |

[MHz]

IMAGE FORMING APPARATUS THAT IMPROVES FCOT

BACKGROUND OF THE INVENTION

Field of the Invention

The present invention relates to an image forming apparatus which reads an original, temporarily stores image data in a storage unit, and then transfers the image data to an image forming unit to form an image.

Description of the Related Art

There has been proposed an image reading apparatus which conveys an original onto an original platen glass to read images on a front side and a back side of the original at the same time (see U.S. Pat. No. 8,477,387). In this image reading apparatus, a sensor which reads a front side of an original and a sensor which reads a back side of an original are placed in proximity to each other, and it is possible to read an image on a front side and an image on a back side at the same time without inverting an original.

On the other hand, there has been proposed an image forming apparatus which temporarily stores image data, which has been read by an image reading apparatus, in, for example, an image memory, takes the image data from the image memory with predetermined timing, and transfers the image data to an image processing unit which in turn performs image processing (see Japanese Laid-Open Patent Publication (Kokai) No. 2000-280580).

According to the technique described in U.S. Pat. No. 8,477,387, in a one-sided mode and a double-sided mode, reading productivity is increased by changing image data transfer blank time periods (blank time periods between transfer of originals) according to whether an operating mode is the one-sided mode or the double-sided mode.

The technique described in U.S. Pat. No. 8,477,387, however, has room for improvement because no twists are added to a reading method or the like in the one-sided mode although reading productivity in the double-sided mode is increased.

Lately, it has become possible to reduce the time that elapses before output of a copy image on a first original from an image forming unit is completed after the first original is read (First Copy Output Time; hereafter referred to as "FCOT") is reduced.

This is because when the time that elapses from depression of a copy start button by a user to reading of image data by an image reading unit and printing-out of the image data by an image forming unit is long, this makes the user wait for a long time, and as compared to a case where FCOT is short, total power consumption is high. In the following description, "reduce FCOT" is expressed as "improve FCOT".

SUMMARY OF THE INVENTION

The present invention provides an image forming apparatus which is capable of reading an original, temporarily storing image data in a storage unit, and then transferring the image data to an image forming unit to improve FCOT in forming an image.

Accordingly, the present invention provides an image forming apparatus comprising a tray on which an original is placed, a conveying unit configured to convey the original placed on the tray, a first reading unit configured to read a first side of the original being conveyed, a second reading unit configured to read a second side of the original being conveyed, a memory configured to store image data output from the first and second reading units, and an image forming unit configured form an image on a recording medium based on the image data stored in the memory, wherein a first memory output frequency in a first mode in which one side of an original is read and an image is formed on one side of a recording medium is lower than a second memory output frequency in a second mode in which both sides of an original are read and an image is formed both sides of a recording medium.

Further features of the present invention will become apparent from the following description of exemplary embodiments (with reference to the attached drawings).

BRIEF DESCRIPTION OF THE DRAWINGS

FIG. 8 is a timing chart showing the start timing of memory output when the size of an original is uncertain.

FIG. 9 is a diagram showing memory output frequencies determined for original sizes in respective operating modes.

FIGS. 12A to 12D are timing charts showing a variety of processes for operating modes according to the second embodiment.

FIG. 13 is a diagram showing memory output frequencies set for original sizes in respective operating modes according to the second embodiment.

DESCRIPTION OF THE EMBODIMENTS

Hereafter, embodiments of the present invention will be described in detail with reference to the drawings.

Figure 1:
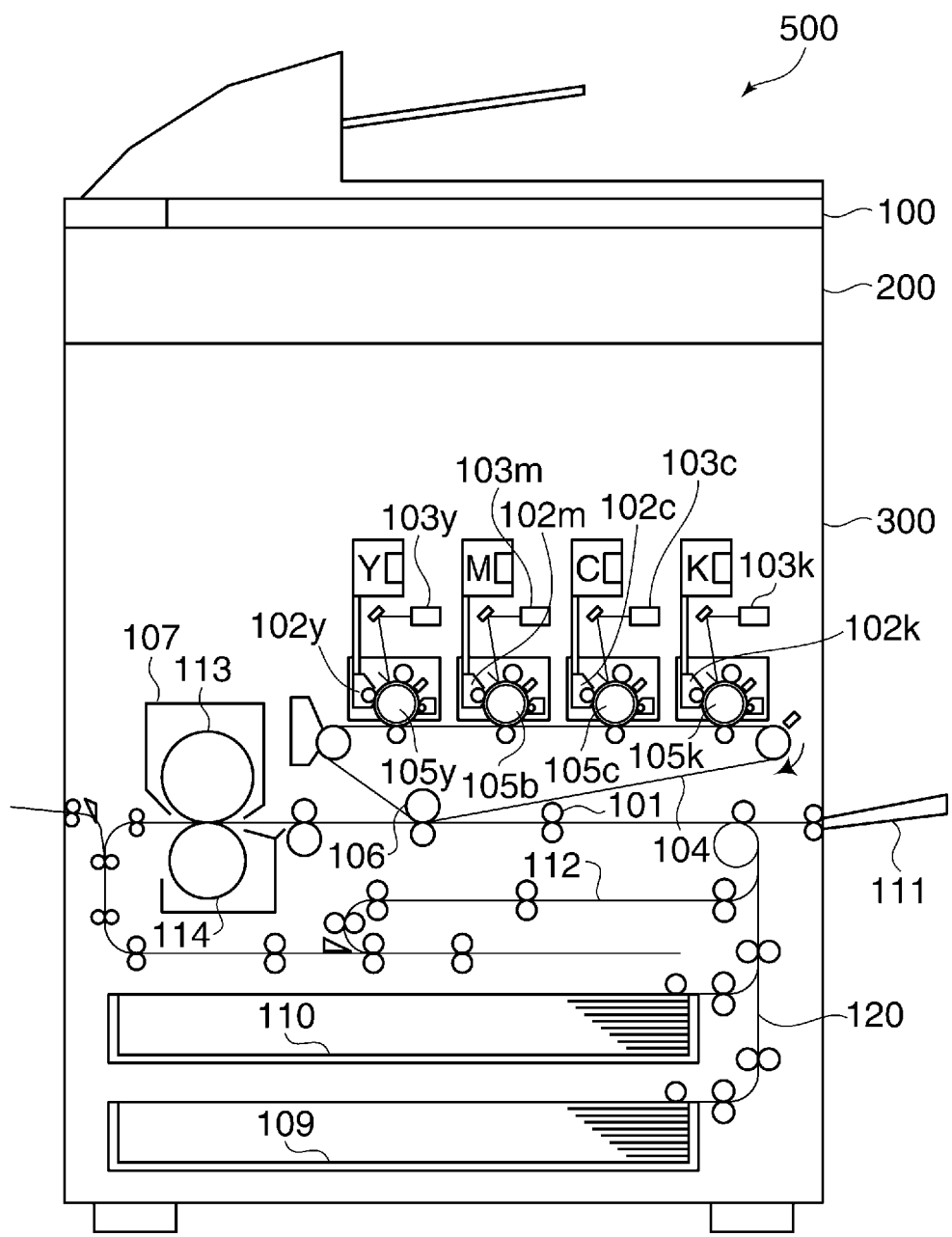
FIG. 1 is a cross-sectional view schematically showing an arrangement of an image forming apparatus according to an embodiment of the present invention.

FIG. 1 is a cross-sectional view schematically showing an arrangement of an image forming apparatus according to an embodiment of the present invention. This image forming apparatus is a copier equipped with an image reader, but may be a facsimile, or a multifunctional peripheral equipped with functions of a copier and a facsimile.

Referring to FIG. 1, the image forming apparatus 500 is comprised mainly of an original feeder (ADF) 100, an image reader (reader) 200, and a printer 300, which is an image forming unit.

The printer 300 has a plurality of (in FIG. 1, four) image forming units that are placed in a substantially horizontal direction and have respective photosensitive drums 105y to 105k for yellow (y), magenta (m), cyan (c), and black (k) colors.

The image forming units have respective exposure devices 103y to 103k and developing devices 102y to 102k as well as the photosensitive drum 105y to 105k. The exposure devices 103y to 103k irradiate the respective photosensitive drums 105y to 105k with laser light according to image data on an original sent from the image reader 200 and form electrostatic latent images on surfaces of the respective photosensitive drums 105y to 105k. The developing devices 102y to 102k contain chromatic toners i.e. yellow (y), magenta (m), cyan (c), and black (k) toners, respectively, and develop electrostatic latent images formed on surfaces of the respective photosensitive drums 105y to 105k to form toner images.

Primary transfer rollers are disposed in opposed relation to the respective photosensitive drums 105y to 105k of the image forming units. An endless intermediate transfer belt 104 is tightly stretched for conveyance between the photosensitive drums 105y to 105k and the primary transfer rollers. The intermediate transfer belt 104 rotationally moves to abut against the surfaces of the photosensitive drums 105y to 105k. In primary transfer units comprised of the photosensitive drums 105y to 105k and the opposed rollers, toner images of the respective colors formed on the surfaces of the photosensitive drums 105y to 105k are successively transferred onto and superposed on the intermediate transfer belt 104 to form a color image.

One stretching roller over which the intermediate transfer belt 104 is tightly stretched and a secondary transfer roller opposed to the stretching roller form a secondary transfer unit 106. A fixing device 107 is disposed downstream of the secondary transfer unit 106. The fixing device 107 has a fixing roller 113 incorporating a heater and a pressurizing roller 114.

Sheet-feeding cassettes 109 and 110 are disposed below the intermediate transfer belt 104. The sheet-feeding cassettes 109 and 110 convey sheets placed thereon by way of a conveying path 120. A conveyed sheet abuts against registration rollers 101 and temporarily stops to be delivered into the secondary transfer unit 106 in synchronization with conveyance of toner images on the intermediate transfer belt 104 into the secondary transfer unit 106. When a sheet passes through the secondary transfer unit 106, toner images on the intermediate transfer belt 104 are transferees onto the sheet through the action of a predetermined bias current. The sheet that is conveyed to the secondary transfer unit 106 may be one conveyed from a manual sheet-feeding unit 111 or a double-sided conveying path 112 as well as the sheet-feeding cassettes 109 and 110.

The sheet onto which the toner images have been transferred is delivered into the fixing device 107, and the toner images are fixed onto the sheet through the action of the fixing roller 113 and the pressurizing roller 114. The fixing roller 113 and the pressurizing roller 114 are set at optimum temperatures according to a type of the sheet. The sheet with the toner images fixed thereon is discharged from the printer 300.

Figure 2:
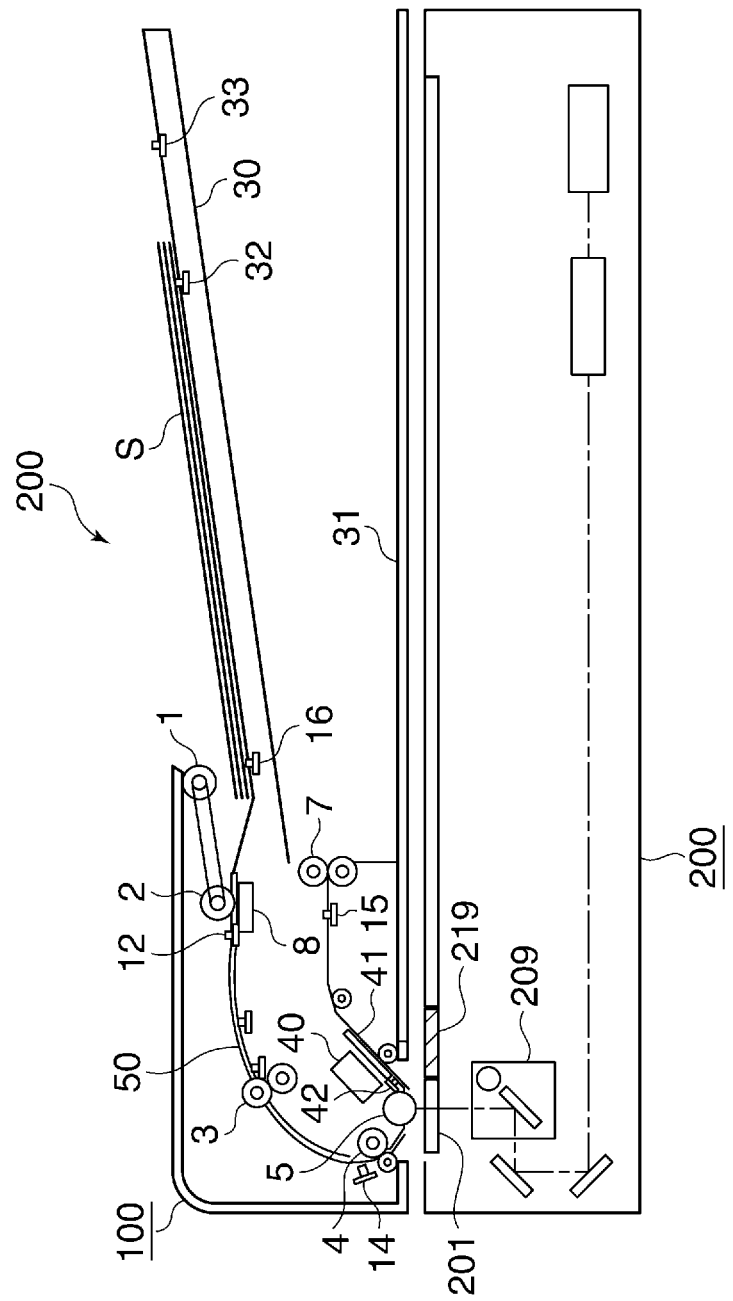
FIG. 2 is a cross-sectional view schematically showing arrangements of an original feeder and an image reader in the image forming apparatus in FIG. 1.

FIG. 2 is a cross-sectional view schematically showing arrangements of the original feeder (ADF) 100 and the image reader (reader) 200 in the image forming apparatus 500 in FIG. 1.

Referring to FIG. 2, the ADF 100 has an original tray 30, an original presence-absence detecting sensor 16, which is provided at an end of the original tray 30 in a sheet-feeding direction, and a sheet-feeding roller 1, which is provided above the original presence-absence detecting sensor 16. The ADF 100 has a curved conveying path 50 which is a sheet convening path, and a discharged original tray 31 provided at an exit of the convening path 50. Size detecting sensors 32 and 33, which are placed with a predetermined space left therebetween to detect a size of an original, are disposed on an original mounting surface of the original tray 30. The original tray 30 supports an original batch S comprised of originals P so that the originals P can be fed. The original presence-absence detecting sensor 16 detects the presence or absence of an original P on the original tray 30.

A separation roller 2 and a separation pad 8, which is opposed to the separation roller 2, are provided at an entrance to the conveying path 50. The separation roller 2 separates originals P one by one from an uppermost part of the original batch S delivered by the sheet-feeding roller 1. A post-separation sensor 12, registration rollers 3, a lead sensor 14, original pre-reading rollers 4, and an original reading platen roller 5 are provided downstream of the separation roller 2 on the conveying path 50, and a sheet-discharging sensor 15 and a sheet-discharging rollers 7 are provided at an exit of the conveying path 50.

A back-side platen glass 41 and a back-side scanner unit 40, which is opposed to the back-side platen glass 41, are disposed above the conveying path 50 as viewed in FIG. 2 and downstream of the original reading platen roller 5. The back-side platen glass 41 and the back-side scanner unit 40 constitute a back-side image reading unit. On the conveying path 50, a lead sensor 42 is disposed at an entrance to the back-side image reading unit.

Figure 3:
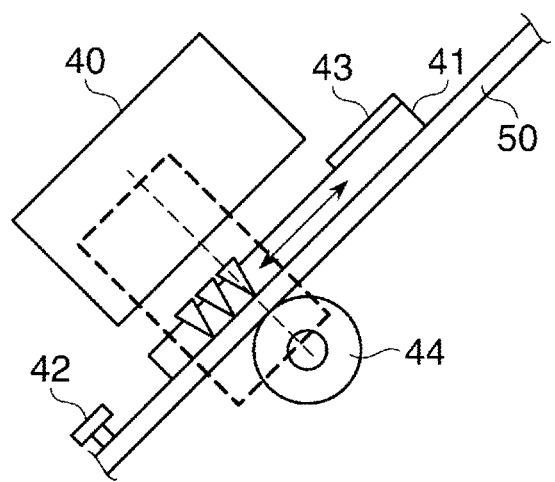
FIG. 3 is an enlarged cross-sectional view showing a back-side image reading unit appearing in FIG. 2.

FIG. 3 is an enlarged cross-sectional view showing the back-side image reading unit appearing in FIG. 2. Referring to FIG. 3, the back-side platen glass 41 and the back-side scanner unit 40, which is opposed to the back-side platen glass 41, are disposed along the conveying path 50. A back-side reference white board 43 is provided at one end of the back-side platen glass 41. A back-side platen roller 44 is disposed at such a location as to face the back-side platen glass 41 across the conveying path 50, and the lead sensor 42 is disposed upstream of the back-side platen roller 44.

The back-side scanner unit 40 performs shading correction in a state where the back-side reference white board 43 has been moved to a back-side reading position by movement of the back-side platen glass 41 in a direction indicated by an arrow. The back-side scanner unit 40 reads an image off an original that is conveyed in the back-side image reading unit, which is enclosed by broken lines in FIG. 3, in the direction indicated by the arrow across the back-side platen glass 41.

Referring again to FIG. 2, the reader 200 is disposed under the ADF 100 and has a platen glass 201, which is opposed to the image reading platen roller 5 of the ADF 100. The platen glass 201 is provided with a reference white board 219. A scanner unit 209 movable horizontally as viewed in FIG. 2 is disposed under the platen glass 201. The scanner unit 209 has a lamp, which is a light source, and a mirror. The scanner unit 209 is incorporated in an original front-side reading unit 280 of a reader control unit 250 (FIG. 4), to be described later.

A description will now be given of a control arrangement of the image forming apparatus 500.

Figure 4:
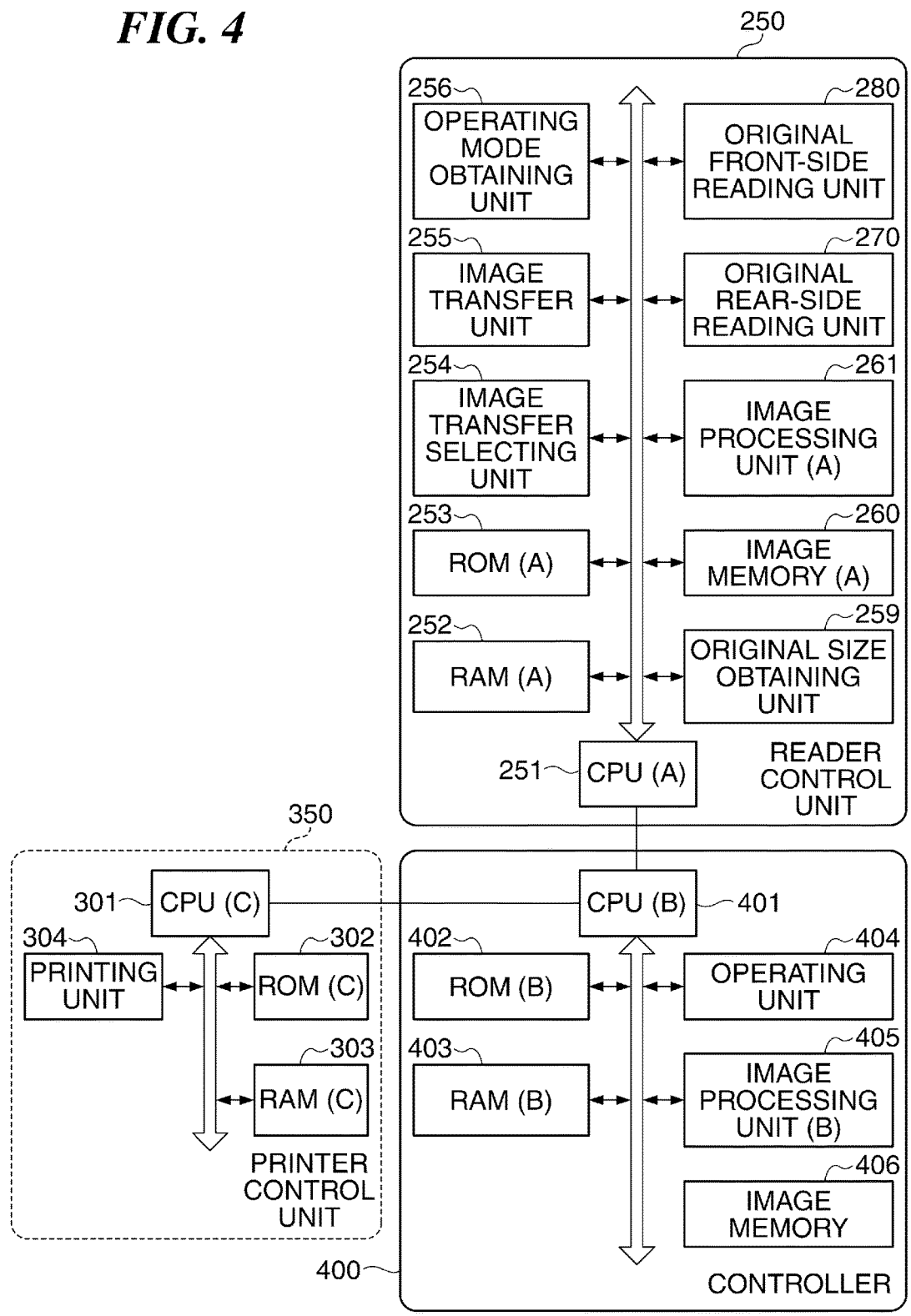
FIG. 4 is a block diagram showing a control arrangement of the image forming apparatus in FIG. 1.

FIG. 4 is a block diagram showing the control arrangement of the image forming apparatus 500 in FIG. 1. The image forming apparatus 500 has the reader control unit 250, a printer control unit 350, and a controller 400.

The reader control unit 250 has a CPU (A) 251. The CPU (A) 251 is connected to a RAM (A) 252, a ROM (A) 253, an image transfer selection unit 254, an image transfer unit 255, and an operating mode obtaining unit 256. The CPU (A) 251 is connected to an image size obtaining unit 259, an image memory (A) 260, an image processing unit (A) 261, an original back-side reading unit 270, and the original front-side reading unit 280.

The printer control unit 350 has a CPU (C) 301. The CPU (C) 301 is connected to a ROM (C) 302, a RAM (C) 303, and a printing unit 304.

The controller 400 has a CPU (B) 401. The CPU (B) 401 is connected to a ROM (B) 402, a RAM (B) 403, an operating unit 404, an image processing unit (B) 405, and an image memory 406. Image data stored in the image memory 406 is read out in conjunction with image formation by the printing unit 304, is subjected to image processing in the image processing unit (B) 405, and is transmitted to the printing unit 304 under the control of the CPU (B) 401 and the CPU (C) 301. The printing unit 304 forms an image on a recording medium based on the received image data.

As described above, the reader 200 has the image memory (A) 260, and image data read by the original front-side reading unit 280 and the original back-side reading unit 270 is temporarily stored and kept in the image memory (A) 260 before being supplied to the controller 400.

By temporarily storing image data in image memory, the image data is output to the controller 400 with arbitrary timing. For example, in a double-sided reading mode, scanner units for a front side and a back side of an original are placed in proximity to each other, and hence reading of an image on the front side and reading of an image on the back side are performed in parallel. In this case, to transfer image data on the front side and image data on the back side to the controller 400 at the same time, two circuits for transferring the image data are needed. Additionally, two circuits for processing the respective images are needed, and this increases the size of the apparatus and brings about an increase in cost. To cope with this, in the present embodiment, image data that has been read is temporarily stored in the image memory (A) 260, and image data on a front side and a back side is successively transferred with such timing that the controller 400 can receive the image data. This makes the apparatus compact and reduces costs.

Image data stored in the image memory (A) 260 is allowed to be subjected to image processing such as smudge image processing by the reader 200 before the image data is transferred to the controller 400. For example, to the platen glass 201 and the platen roller 5, smudges such as sheet powder from originals P and toner coming off the originals P are likely to attach due to conveyance of a large number of originals, and as a result, those smudges may be recorded as smudge data in read image data. By detecting smudges between sheets to identify smudge positions in a main scanning direction, and correcting for image data at the identified smudge positions by the image processing unit (A) 261. Such smudge correction, however, is performed using only image data outside smudge data areas, and it is thus difficult to obtain the same image quality as that of original image data. Smudges on the platen roller 5 are shielded by an original S as viewed from the scanner unit 209 side, and hence they are not supposed to be subjected to smudge correction. By storing read image data in the image memory (A) 260, sheet-to-sheet smudge data and image data for a predetermined distance at a leading end of a sheet are compared together to detect only smudge data that needs to be corrected for, and hence smudge correction is performed. As a result, it is possible to suppress performing smudge correction with respect to image data that does not need to be subjected to smudge correction.

Further, due to the function of storing read image data in the image memory (A) 260, an image reading process is continued even when image processing by the controller 400 is delayed. For example, when image processing by the controller 400 is delayed in a case where no image data is stored in the image memory (A) 260, the ADF 100 must stop conveyance of an original and stand by until the controller 400 is ready to receive next image data. This decreases productivity. On the other hand, in a case where image data is stored in the image memory (A) 260, an image reading operation is allowed to be continued unless the image memory (A) 260 becomes full even before the controller 400 is ready to receive next image data. Immediately after the controller 400 is ready to receive next image data, accumulated image data is allowed to be transferred. Namely, a reduction in the productivity of the overall system is prevented or suppressed.

A description will now be given of a one-sided image reading operation using the ADF 100 and the reader 200 of the image forming apparatus 500 in FIG. 1.

The ADF 100 and the reader 200 are controlled by the CPU (A) 251 and the CPU (C) 301, respectively, which receive instructions from the CPU (B) 401 of the controller 400.

When an original reading job is started, the scanner unit 209 of the reader 200 moves to a position immediately below the reference white board 219 to perform shading correction. After completing the shading correction, the scanner unit 209 moves to such a position as to face the original reading platen roller 5 across the platen glass 201 and stands by until an original P reaches a reading position.

On the other hand, in the ADF 100, when the original reading job is started, the sheet-feeding roller 1 moves down to an original surface of an original batch S to reach an upper surface of the uppermost original P and starts rotating, causing the uppermost original P to be fed. The originals P fed by the sheet-feeding roller 1 are separated one by one through the action of the separation roller 2 and the separation pad 8. A separating process operation is implemented by a well-known separation process technique. The separation roller 2 and the separation pad 8 prevent multi-feeding of originals.

The original P separated by the separation roller 2 and the separation pad 8 is conveyed to the registration rollers 3, abuts against the registration rollers 3 standing still, and temporarily stops. The original P that has temporarily stopped is further conveyed a short distance in a state of being in abutment against the registration rollers 3, and this causes a part of a leading end side of the original P to lift and form a loop, and when this loop is eliminated, skewing of the original P is corrected for.

The original P that has been corrected for skewing is conveyed to a reading position in proximity to the platen glass 201 by the original pre-reading rollers 4. At this time, when the controller 400 is ready to receive image data, the controller 400 sends an image reading request to the reader control unit 250. When the reader control unit 250 receives the image reading request, the CPU (A) 251 of the reader control unit 250 drives the registration rollers 3 and conveys again the original P, which is at a temporary stop after abutting against the registration rollers 3 and formed the loop, toward downstream of the registration rollers 3.

The original P conveyed by the registration rollers 3 is conveyed to the original pre-reading rollers 4, which in turn further conveys the original P to an original reading position on the platen glass 201. At this time, in order to detect a reading leading end position of the original P, the lead sensor 14 detects a leading end of the original P delivered to the original reading position. Then, the timing with which the original P reaches the original reading position on the platen glass 201 is determined based on a count value of pulses output to a conveying motor (not shown), which is a driving source for the original pre-reading rollers 4 and the original reading platen roller 5, after the lead sensor 14 detects the original P and is turned on. When a stepping motor is used as the conveying motor, the distance over which the original P is conveyed in response to one pulse output to the conveying motor is fixed. Thus, the timing with which the original P reaches the original reading position on the platen glass 201 is determined based on a count value of pulses output to the conveying motor.

Therefore, in response to the count result reaching a count value corresponding to the distance from the lead sensor 14 to the original reading position for a surface image, reading of the original is started.

On the other hand, when the post-separation sensor 12 detects a trailing end of the original P, the presence or absence of a subsequent original on the original tray 30 is detected by the original presence-absence detecting sensor 16. Information on the subsequent original detected by the original presence-absence detecting sensor 16 is sent to the controller 400.

Due to conveyance of the original P, a trailing end of the original P passes through the separation roller 2, the registration rollers 3, the original pre-reading rollers 4, and the original reading platen roller 5 in this order and is detected by the sheet-discharging sensor 15. Triggered by the trailing end of the original P being detected by the sheet-discharging sensor 15, the original P is discharged toward the discharged original tray 31 by the sheet-discharging rollers 7 after a lapse of a predetermined time period after the trailing end of the original P is detected, and this completes the sequence in the one-sided reading mode for one original.

In principle, feeding, reading, and discharging of originals described above are repeated until the original tray 30 becomes empty of the originals P, except as only a predetermined number of originals are read according to a job setting. In a case where the original presence-absence detecting sensor 16 detects the absence of an original when the post-separation sensor 12 has detected a trailing end of an original, the CPU 251 determines that an original P being conveyed is a last one. When the last original is discharged onto the discharged original tray 31, the CPU 251 stops the conveying motor, which is a driving source for the rollers, and brings the sheet-feeding roller 1 back to the original position to end the original reading job.

A description will now be given of a double-sided original reading operation using the ADF 100 and the reader 200 of the image forming apparatus 500 in FIG. 1.

In the double-sided original reading operation using the ADF 100 and the reader 200, the scanner unit 209 is used to read a front side original, and the scanner unit 40 is used to read a back side original. It should be noted that the scanner unit 40 is incorporated in the original back-side reading unit 270 of the reader control unit 250 in FIG. 4. As for conveyance of originals, originals P are successively fed one by one from the uppermost one of an original batch S stacked on the original tray 30 in the same manner as in the one-sided original reading operation described above. An image on a front side of a fed original is read in the manner described above, and therefore, detailed description thereof is omitted.

An image on a back side of an original P is read as described hereafter. After a leading end of the original P passes through the original reading position for front-side images (the position immediately below the original reading platen roller 5 in FIG. 2), the leading end of the original P is detected by the lead sensor 42. By counting pulses output to the conveying motor (not shown) after the lead sensor 42 detects the leading end of the original P (ON), the timing with which the leading end of the original P reaches the original reading position for back-side images on the plate glass 41 is determined. Thus, in response to the count result reaching a count value corresponding to the distance from the lead sensor 14 to the original reading position for back-side images, reading of an original is started.

A description will now be given of the timing with which read image data is input to and output from the image memory (A), and an image is formed by the printer.

Figure 5A:
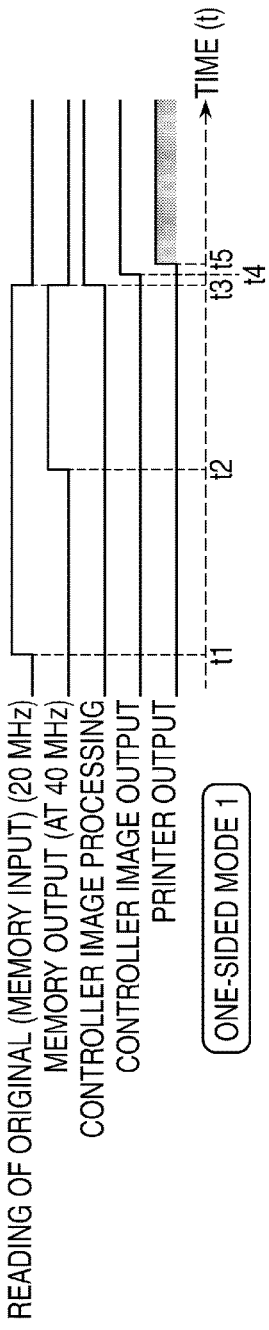
FIGS. 5A to 5C are timing charts showing a process in which image data read by an original reading unit is temporarily stored in an image memory and then output, and after that, image formation is started by a printer.
Figure 5B:
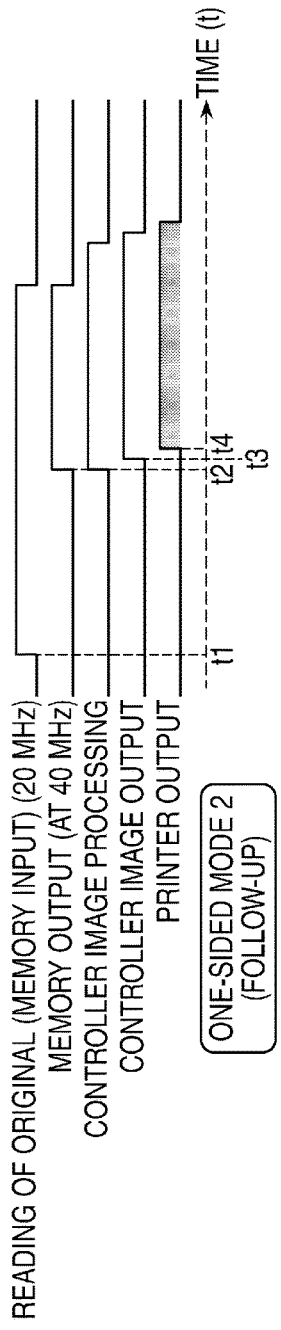
Figure 5C:
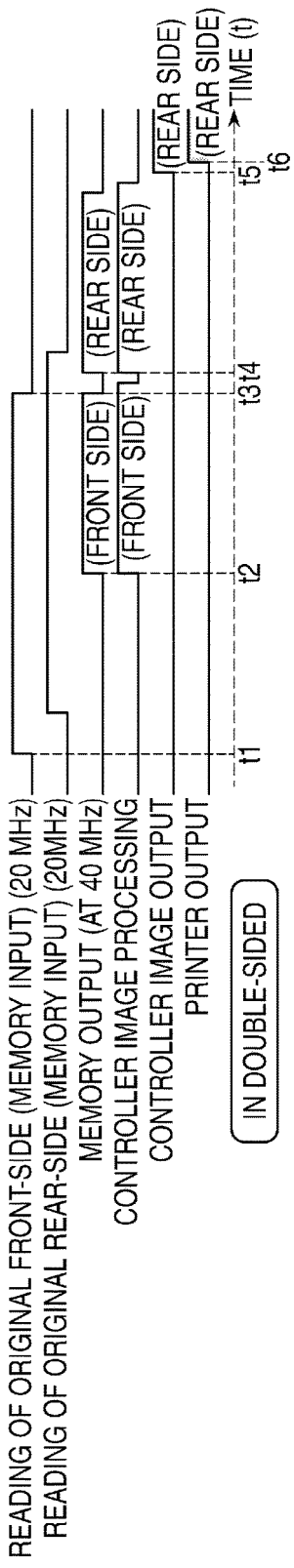

FIGS. 5A to 5C are timing charts showing a process in which image data read by the original front-side reading unit 280 or the original back-side reading unit 270 is temporarily stored in the image memory (A) 260 and then output, and image formation is started by the printer 300. Hereafter, one-sided modes (FIG. 5A and FIG. 5B) and a double-sided mode (FIG. 5C) will be described separately.

First, in a one-sided mode 1 in FIG. 5A, before the scanner unit 209 starts to read an image, a storage area for image data is reserved in the image memory (A) 260 in advance. Next, when an image reading operation is started, read image data is successively stored in the area reserved in the image memory (A) 260. The stored image data is read out, subjected to image processing such as color registration and smudge correction described above by the image processing unit (A) 261, and transferred to the controller 400 by the image transfer unit 255 with predetermined timing. At this time, an input frequency at which image data is input to the image memory (A) 260 and an output frequency at which image data is output from the image memory (A) 260 to the controller 400 are set independently of each other.

In the one-sided mode 1, the input frequency at which image data is input to the image memory (A) 260 is set to 20 MHz, and the output frequency at which image data is output from the image memory (A) 260 is set to 40 MHz.

The timing with which after input of image data to the image memory (A) 260 is started, memory output i.e. output of the input image data from the image memory (A) 260 is started (t2 in FIG. 5A) is determined according to [Equation 1] below using a size of a read image and a ratio between an input frequency to an output frequency.

Reading size length×(1−input frequency/output frequency) [Equation 1]

When the distance over which after reading of the original is started, an original is conveyed by a motor (not shown) which is used to control conveyance of originals reaches the distance calculated according to [Equation 1], memory output is started, and hence with timing t3 in FIG. 5A, memory input and memory output are brought to an end at the same time.

One of the reasons why the timing calculated according to [Equation 1] is adopted is as follows. In the present embodiment, an output frequency higher than an input frequency is adopted, and hence if memory output is started earlier than predetermined timing, it is assumed that memory output outpaces memory input while memory input is in progress.

Image processing is performed by the controller 400 after memory output is completed, and hence a pattern in which memory output ends at substantially the same time as the end of memory input corresponds to a pattern in which an image is output the most quickly from the controller 400 to the printer 300. Namely, by adopting the timing calculated according to [Equation 1] above, printer output is started the most quickly (with timing t5 in FIG. 5A) without memory output outpacing memory input.

The distance over which an original is conveyed by the motor (not shown), which is used to control conveyance of originals, is obtained by counting motor pulses from the motor (not shown), which is used to control conveyance of originals. The distance over which an original is conveyed in response to one motor pulse is fixed. Thus, the number of motor pulses corresponding to the distance obtained using [Equation 1] is uniquely determined.

For example, when the size of an original P is A4R (a sub scanning length of 297 mm), memory output is started when an original has been conveyed 297×(1−20/40)=148.5 (mm) (time t2 in FIG. 5A) since memory input was started (time t1 in FIG. 5A). Namely, when image data for 148.5 (mm) has been input to a memory, memory output is started. After that, memory output is brought to an end with the timing t3 in FIG. 5A, predetermined image processing is performed by the controller 400, image transfer to the printer 300 is started with timing t4, and then image formation is started by the printer 300 with the timing t5.

A description will now be given of a one-sided mode 2 in FIG. 5B. In the one-sided mode 2, the printer 300 starts image formation without waiting for output of image data from the image memory (A) 260 to the controller 400 to be completed. Namely, printer output by the printer 300 is started early. In this mode, even when input to the image memory (A) 260 is in progress, the printer 300 starts printer output to follow memory input, and hence this mode will hereafter be referred to as "printer follow-up control".

Under normal conditions, as with the one-sided mode 1 described above, the printer 300 starts image formation after transfer of image data to the controller 400 (memory output) is completed, but under a specific condition, the printer 300 is allowed to start image formation without waiting for transfer of image data to be completed. The specific condition is that before receiving image data of one page from the image memory (A) 260, the controller 400 is allowed to successively perform image processing on the received image data and transfer the image data to the printer 300. Examples of this case are cases other than the case where the controller 400 carries out processes that require image data on the whole surface of an original, such as an image data rotating process and an output size changing process.

Under such a specific condition, the controller 400 receives image data subjected to memory output from the image memory (A) 260, successively performs image processing on the image data, and converts the image data into image formation data that is to be output to the printer 300. After that, the controller 400 transfers the image formation data to the printer 300 with timing t3 in FIG. 5B. As a result of this, printer output is started with timing t4 in FIG. 5B, and printer output is started earlier than in the case where printer follow-up control is not provided (the one-sided mode 1).

A description will now be given of a double-sided mode in FIG. 5C. In the double-sided mode, image data on a front side of an original and image data on a back side of the original are read at substantially the same time and input to the image memory (A) 260.

In the double-sided mode, before the scanner unit 209 starts to read an image on a front side, storage areas for storing front-side image data and back-side image data, respectively, are reserved in the image memory (A) 260 in advance. When an image reading operation is started, read image data is successively stored in the storage areas reserved in the image memory (A) 260 for the front side and the back side.

The number of circuits for transferring image data from the image memory (A) 260 to the controller 400 is one, not two, and hence image data stored in the image memory (A) 260 is subjected to memory output toward the controller 400 on a side-by-side basis. For this reason, first, image data on a front side is transferred to the controller 400 with timing t2 in FIG. 5C calculated according to [Equation 1]. Then, immediately after output of the front-side image data from memory is completed, and a notification that the controller 400 is ready to receive an image on a next page is received from the controller 400, image data on a back side is output from memory (transferred) to the controller 400 with timing t4 in FIG. 5C. In memory output of image data, image data on a front side or a back side of an original which is to be transferred is selected through the image transfer selecting unit 254, and the selected image data is transferred.

After memory output of the back-side image data is completed, the controller 400 outputs image formation data to the printer 300 with timing t5 in FIG. 5C, and the printer 300 starts printer output with timing t6 in FIG. 5C.

A description will now be given of an image data output process in which image data stored in the image memory (A) 260 is output to the controller 400. In this image data output process, an output frequency at which image data is output to the controller 400 is selected, and a printer output ending time is determined based on the selected output frequency. An output frequency at which image data stored in the image memory (A) 260 is output to the controller 400 will hereafter be referred to as a memory output frequency.

In the present embodiment, printer output means a process carried out from when the printer 300 starts to receive image formation data output from the controller 400 and starts an image forming process to when a last image is fixed to a sheet conveyed to the secondary transfer unit 106. It should be noted that a process from the start of sheet feeding from the sheet-feeding cassette 109 or 110 to fixing of an image to a fed sheet is referred to as printer output sometimes.

Figure 6:
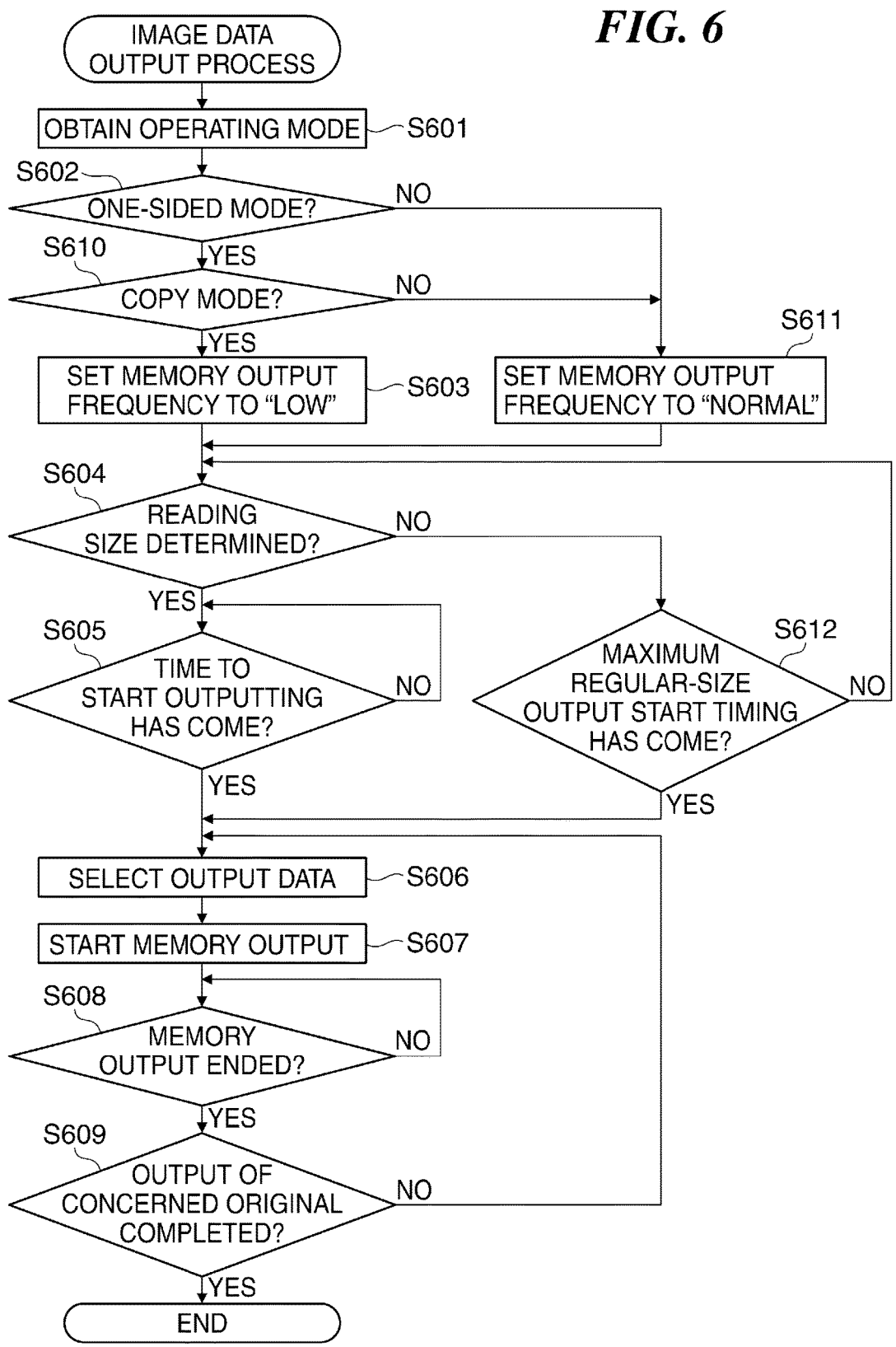
FIG. 6 is a flowchart showing the procedure of an image data output process in which image data stored in the image memory is output to a controller.

FIG. 6 is a flowchart showing the procedure of an image data output process in which image data stored in the image memory (A) 260 is output to the controller 400. This image data output process is carried out by the CPU (A) 251 of the reader control unit 250, which controls the reader 200, in accordance with a program stored in the ROM (A) 253.

When the image data output process is started, first, the CPU (A) 251 obtains a designated operating mode (step S604). The operating mode may be designated by a user through the operating unit 404 of the controller 400 or designated by using an application or the like through a PC or the like. The operating mode includes various settings as to copy function/document scan (hereafter referred to as the "SEND function"), one-sided/double-sided, color/monochrome, regular-size/mixed (irregular-size), and so on.

After obtaining the operating mode, the CPU (A) 251 judges whether or not the designated operating mode is a one-sided mode (step S602). As a result of the judgment in the step S602, when the designated operating mode is the one-sided mode ("YES" in the step S602), the CPU (A) 251 judges whether or not the designated operating mode is a copy mode (step S610). As a result of the judgment in the step S610, when the designated operating mode is the copy mode ("YES" in the step S610), the CPU (A) 251 sets the memory output frequency to "Low" (step S603). "Low" means that the memory output frequency is lower than "Normal". In the present embodiment, "Low" means that the memory output frequency is 30 MHz, and "Normal" means that the memory output frequency is a default memory output frequency i.e. 40 MHz.

On the other hand, as a result of the judgment in the step S602, when the designated operating mode is not the one-sided mode ("NO" in the step S602), the CPU (A) 251 sets the memory output frequency to "Normal" (step S611). Also, as a result of the judgment in the step S610, when the designated operating mode is not the copy mode ("NO" in the step S610), the CPU (A) 251 sets the memory output frequency to "Normal" (step S611).

A description will now be given of how the memory output frequency is changed according to a selected mode.

First, a description will be given of a process in which the memory output frequency is set to "Low" when a selected mode is the one-sided mode and the copy mode (step S603).

In the present embodiment, the memory output frequency higher than an image forming (exposure) frequency of the printer is set.

Figures 7A, 7B, 7C:
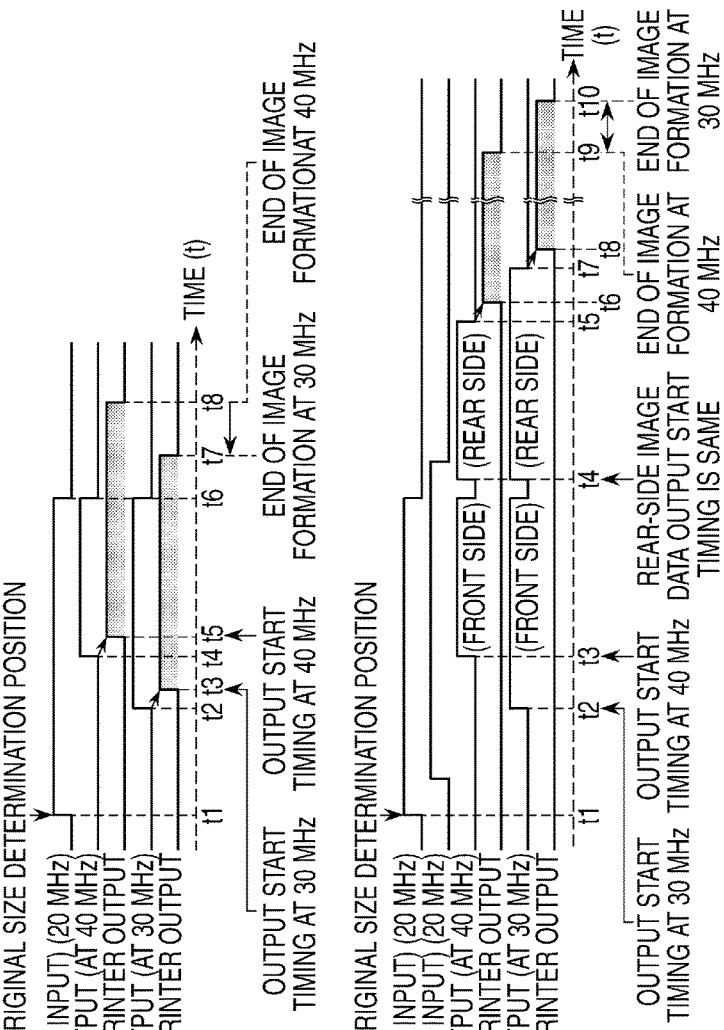
FIGS. 7A to 7C are timing charts showing a variety of processes for operating modes.

FIGS. 7A to 7C are timing charts showing a variety of processes suitable for operating modes. It should be noted that in FIG. 7, the time period for which image processing is performed by the controller 400 and the time period for which image data is output from the controller 400 are omitted for the convenience of explanation.

FIG. 7A shows the relationship between the output frequency at which image data is output from the mage memory (A) 260 to the controller 400 and the time at which printer output ends.

Referring to FIG. 7A, the timing of memory output needs to be controlled so as not to outpace the end of memory input. Specifically, a pattern in which memory output ends at the earliest time is a pattern in which memory output is completed at substantially the same time as memory input, and the timing with which memory output is started varies with output frequencies.

The start timing of memory output is determined according to [Equation 1] above, and after reading of an original's length (memory input) corresponding to the obtained distance is completed, memory output is started. For example, when the size of an original P is A4 (297 mm), memory output is started after 99 mm of the original is read (t2 in FIG. 7A) when the output frequency is 30 MHz, and memory output is started after 148.5 mm of the original is read (t4 in FIG. 7A) when the output frequency is 40 MHz. Namely, when the memory output frequency is 30 MHz, output of image data to the controller 400 is allowed to be started earlier than in the case where the memory output frequency is 40 MHz. Here, the time period that elapses from the start of output of image data to the printer 300 to the completion of printing is the same irrespective of memory output frequencies. Therefore, when the controller 400 determines that printer follow-up control is possible, printer output ends (t7 in FIG. 7A) earlier when the memory output frequency is set to as low as 30 MHz because the start timing of memory output is early. This improves FCOT as well.

A description will now be given of the relationship between the output frequency at which image data is output from the mage memory (A) 260 to the controller 400 and the time at which printer output ends in the double-sided mode (FIG. 7B) and modes other than the one-sided and copy mode (FIG. 7C).

In the double-sided mode i.e. double-sided copy mode, the printer 300 starts image formation from a back-side image in view of transfer, transfer sheet inverting conveyance, and so on. Thus, as shown in FIG. 7B, the start timing of image formation comes after output of back-side image data from the mage memory (A) 260 is completed. The timing with which output of back-side image data is started comes after output of front-side image data (memory output) is completed. Therefore, the timing with which output of back-side image data is started is t4 in FIG. 7B irrespective of memory output frequencies.

For this reason, when the memory output frequency is set to "Low (30 MHz)", the output completion timing is later (t7 in FIG. 7B) than in the case where the memory output frequency is "Normal (40 MHz)" (t5 in FIG. 7B) by an amount corresponding to {Output time when "Normal"×(40/30)}. The time period that elapses from start to completion of printer output is the same irrespective of memory output frequencies.

For this reason, in the double-sided copy mode, when the memory output frequency is 30 MHz, printer output continues until timing t10 in FIG. 7B. On the other hand, when the memory output frequency is 40 MHz, printer output is completed with timing t9 in FIG. 7B. Thus, when the memory output frequency in the double-sided copy mode is set to "Normal (40 MHz)".

Also, even if the printer continues printer output through follow-up control from the start of output of a back-side image, the time period required for printer output is the same irrespective of output frequencies in the present embodiment. However, if the timing with which back-side image data is output from memory is delayed, the timing with which front-side image data on a next original starts to be output from memory is delayed accordingly, resulting in a reduction in productivity. Therefore, in this case as well, it is preferred that the memory output frequency is set to 40 MHz.

The modes other than the one-sided and copy mode are modes that do not require printer output such as a mode in which image data is transferred to other network equipment. In this case, in view of a post-process, it is preferred that for an image reading/image data transferring process by an image reading apparatus, an output frequency that enables the process to be completed earlier is selected from a plurality of output frequencies.

A description will now be given of a transmission mode which is an example of the modes other than the one-sided and copy mode and in which an irregular-size original is read, and a read image is output (FIG. 7C).

FIG. 7C shows the relationship between the output frequency and the output ending time when image data is output from the image memory (A) 260 to the controller 400 in the one-sided transmission mode.

When an original is of an irregular size, a size of an original detected by the size detecting sensor 32, 33, or the like of the original tray 30 and a size of an original that is an object to be read at present may be different from each other. For this reason, the earliest timing with which memory output is started is an earlier one of the timing with which a size of an original is determined and the start timing of memory output at an arbitrary output frequency for a maximum original length detectable by the original tray 30 has come.

Referring to FIG. 7C, for example, when the timing with which a size of an original is determined is earlier than timing t2 with which memory output of data on this original is started at a memory output frequency of 30 MHz, memory output is allowed to be started with timing based on [Equation 1] above. Thus, output is completed with timing t5 in FIG. 7C whether the memory output frequency is 30 MHz or 40 MHz.

On the other hand, when the timing with which a size of an original is determined is timing t3 in FIG. 7C, and memory output is started at 30 MHz with the timing t3, output is completed with timing t6. On the other hand, when memory output is started at 40 MHz with timing t4 in FIG. 7C, output is completed with timing t5. It is thus apparent that there is no pattern in which memory output ends earlier in a pattern in which the output frequency is "Low (30 MHz)" than in a pattern in which the output frequency is "Normal (40 MHz). Moreover, since a process to judge whether to set the output frequency to 30 MHz or 40 MHz is dispensed with, and hence in the modes other than the one-sided and copy mode, the output frequency is set to "Normal (40 MHz)" across the board.

Referring again to FIG. 6, after setting the memory output frequency according to the selected operating mode, the CPU (A) 251 judges whether or not a reading size of an original P has been determined (step S604). In the step S604, when the operating mode obtained in the step S601 is a regular-size mode, the CPU (A) 251 judges that the reading size has been determined based on a judgment result obtained by the size detecting sensor 32 or 33, followed by the process proceeding to step S605. Namely, as for an original a reading size of which has been determined, the CPU (A) 251 judges whether or not the start timing of memory output for the reading size of the original has come, and stands by until the time has come (step S605). On the other hand, when the operating mode is a mixed (irregular-size) mode, the CPU (A) 251 judges that the reading size has not been determined, followed by the process proceeding to step S612. The step S612 will be described later.

In the step S605, the start timing of memory output is the timing with which after reading of an original P is started, reading of the original P by an amount corresponding to a length obtained using [Equation 1] above is completed. At this time, the CPU (A) 251 detects a present reading (memory input) position based on the count of motor pulses and judges whether the detection result is equal to or greater than a value obtained using [Equation 1] above. As a result of the judgment in the step S605, when the start timing of memory output has come ("YES" in the step S605), the CPU (A) 251 controls the image transfer selecting unit 254 to select image data (for example, a front side or a back side) that should be transferred to the controller 400 (step S606).

The CPU (A) 251 then outputs the image data to the controller 400 (step S607). Specifically, the CPU (A) 251 controls the image transfer unit 255 to start outputting the image data selected in the step S606 to the controller 400. After the output of the image data is started, the CPU (A) 251 judges whether or not the output of the image data has been completed, and stands by until the output of the image data is completed (step S608). At this time, the CPU (A) 251 counts the number of lines in an output size and judges whether or not the output of the image data has been completed based on whether or not lines corresponding in number to the image data have been output.

As a result of the judgment in the step S608, when the output of the image data has been completed ("YES" in the step S608), the CPU (A) 251 judges whether or not the output of all the image data on the concerned original has been completed (step S609). In this case, when the operating mode is the one-sided mode, the output of the image data has been completed, and hence the CPU (A) 251 brings the image data output process to an end. On the other hand, when the operating mode is the double-sided mode, back-side image data has not yet been transferred to the controller 400, and the process returns to the step S606.

On the other hand, as a result of the judgment in the step S604, when the reading size has not been determined, that is, when the operating mode obtained in the step S601 is the mixed mode, the process proceeds to the step S612. In the mixed mode, originals of multiple sizes are placed on the original tray, and hence a size of an original P being currently conveyed is not always a size that has been detected by the size detecting sensor 32 or 33. Therefore, the CPU (A) 251 judges that in the mixed mode, it is impossible to determine a reading size due to conditions of a reading mode or the like, and after starting a reading operation, judges whether or not the start timing of memory output for a maximum regular size has come (step S612). Examples of maximum-size originals include an LDR original.

When the CPU (A) 251 judges in the step S612 that the start timing of memory output for the maximum regular size has come ("YES" in the step S612), the process proceeds to the step S606. On the other hand, when the CPU (A) 251 judges in the step S612 that the start timing of memory output for the maximum regular size has not come ("NO" in the step S612), the process returns to the step S604.

A description will now be given of how whether or not the start timing of memory output for the maximum regular size has come is judged in the step S612 when the reading size could not been determined.

When the reading size has not been determined using the size detecting sensors 32 and 33 provided on the original tray 30, a size of an original is determined based on the number of motor pulses output from when the lead sensor 14 detects the original (ON) till when the lead sensor 14 stops detecting the original (OFF). However, when the location at which the lead sensor 14 is placed is close to the original reading position, determination of a reading size is delayed. Thus, in the present embodiment, when the time at which output becomes possible in a case where image data on an original of the maximum regular size is output from memory at an output frequency of 30 MHz has come (t3 in FIG. 8), control to start memory output is provided irrespective of a size of an original being currently conveyed.

FIG. 8 is a timing chart showing the start timing of memory output when the size of an original is unknown. Referring to FIG. 8, LTR indicates a letter size sheet (≈A4 size), and LDR indicates a tabloid ledger sheet (≈A3 size). The timing t3 in FIG. 8 is at least the same as or later than the timing with witch output of an original P at 30 MHz is started. Therefore, when memory output is started with the timing t3, memory output never outpaces memory input.

According to the process in FIG. 6, to temporarily store image data, which has been read off an original, in the image memory (A) 260 and then transfer the image data to the controller 400, an output frequency is set according to an operating mode selected by a user. As a result, optimum FCOT suitable for each reading mode is achieved.

FIG. 9 is a diagram showing memory output frequencies set for original sizes in operating modes. Referring to FIG. 9, when the operating mode is a one-sided reading mode, a lower output frequency than that in a double-sided reading mode is set. When the operating mode is a one-sided copy mode, a lower output frequency than that in a double-sided copy mode is set. When the operating mode is a regular-size copy mode, a lower output frequency than that in an irregular-size copy mode is set.

Moreover, according to the present embodiment, when the time to start memory output at 30 MH (t3 in FIG. 8) has come, control to start memory output is provided irrespective of a size of an original P being currently conveyed, and hence effects described hereafter are obtained. When a size of an original is smaller than the maximum regular size, memory output is allowed to be started before determination of a reading size (t4 in FIG. 8) even when the original cannot be output with the start timing of memory output at an output frequency of 30 MHz (t2 in FIG. 8). Thus, by starting memory output in advance before determination of a reading size (t4 in FIG. 8), FCOT is improved although it depends on the timing of control to start output by the printer 300 (for an irregular size, control to start sheet feeding from the cassette 109, 110, or the like), and performance.

A description will now be given of a second embodiment.

A hardware arrangement of an image forming apparatus according to the second embodiment is the same as that of the image forming apparatus according to the first embodiment, and they differ only in their control arrangement. A description will now be given of an image data output process that is carried out in the present embodiment with a focus placed on points of differences from the image data output process in the first embodiment described above.

In the first embodiment described above, a memory output frequency is determined based on an operating mode selected by, for example, a user through the operating unit 404 of the controller 400, and image data is output from memory with timing obtained using the determined memory output frequency.

However, a memory output frequency should not always be determined based on only an operating mode. In the present embodiment, a more appropriate memory output frequency is determined based on information on an image formation speed of a printer or an image formation ending time.

Figure 10:
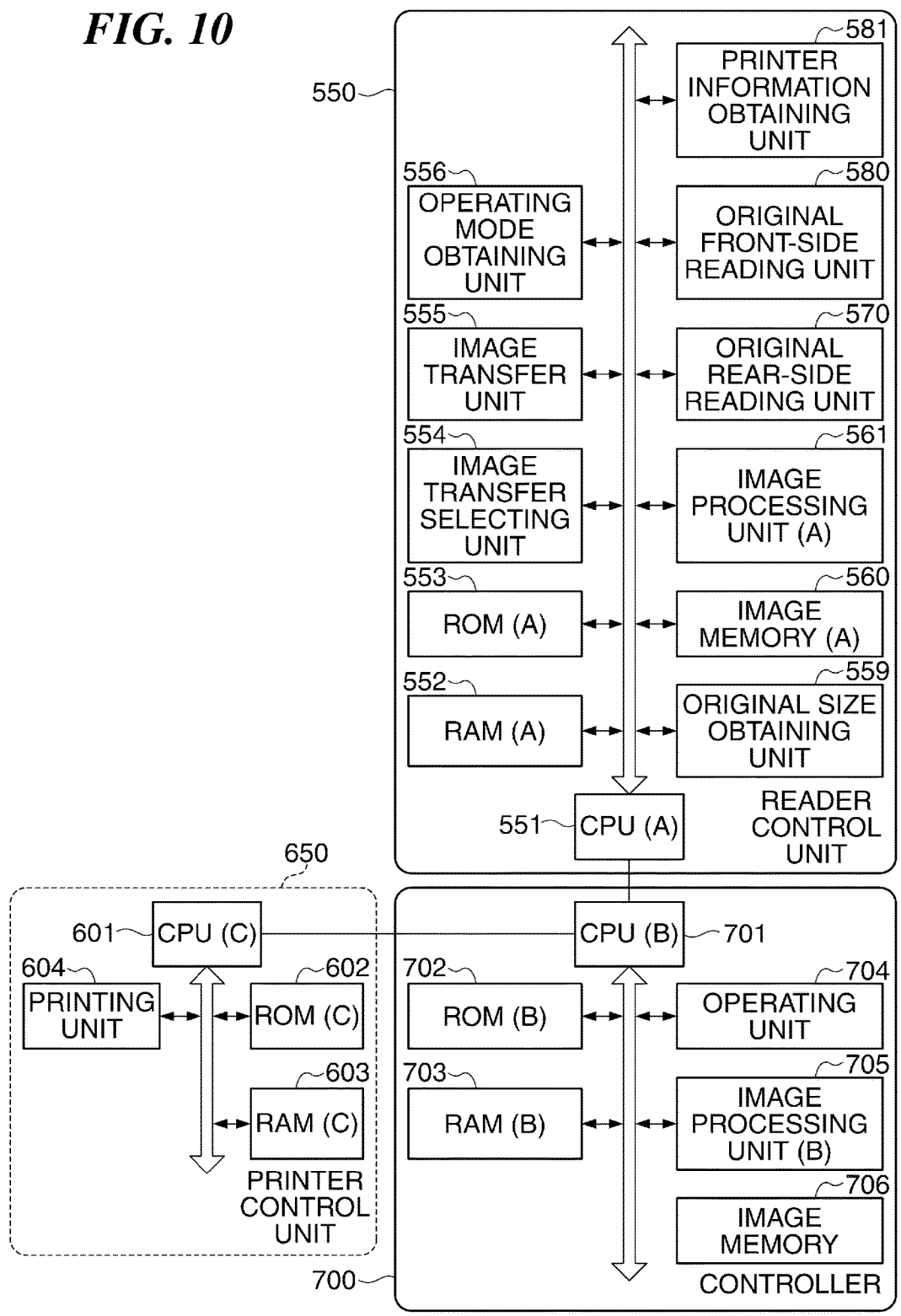
FIG. 10 is a block diagram showing a control arrangement of an image forming apparatus according to a second embodiment of the present invention.

FIG. 10 is a block diagram showing a control arrangement of the image forming apparatus according to the second embodiment. Referring to FIG. 10, a control arrangement of the image forming apparatus according to the present embodiment differs from the control arrangement in FIG. 4 in that a reader control unit 550 has a printer information obtaining unit 581. The printer information obtaining unit 581 receives information on a printer 600 via a controller 700. Examples of the information on the printer 600 include an image formation speed or an image formation ending time.

When an image formation speed of the printer 600 or an image formation ending time for a predetermined output frequency is known in advance, the image formation ending time, for example, is obtained and subjected to comparison to determine a more appropriate memory output frequency. The method that determines a memory output frequency based on an image formation ending time is effective, for example, when the printer output time period becomes shorter than the memory output time period due to an improvement in performance of the printer 600.

A description will now be given of an image data output process in which a memory output frequency is determined with consideration given to an image formation ending time.

Figure 11:
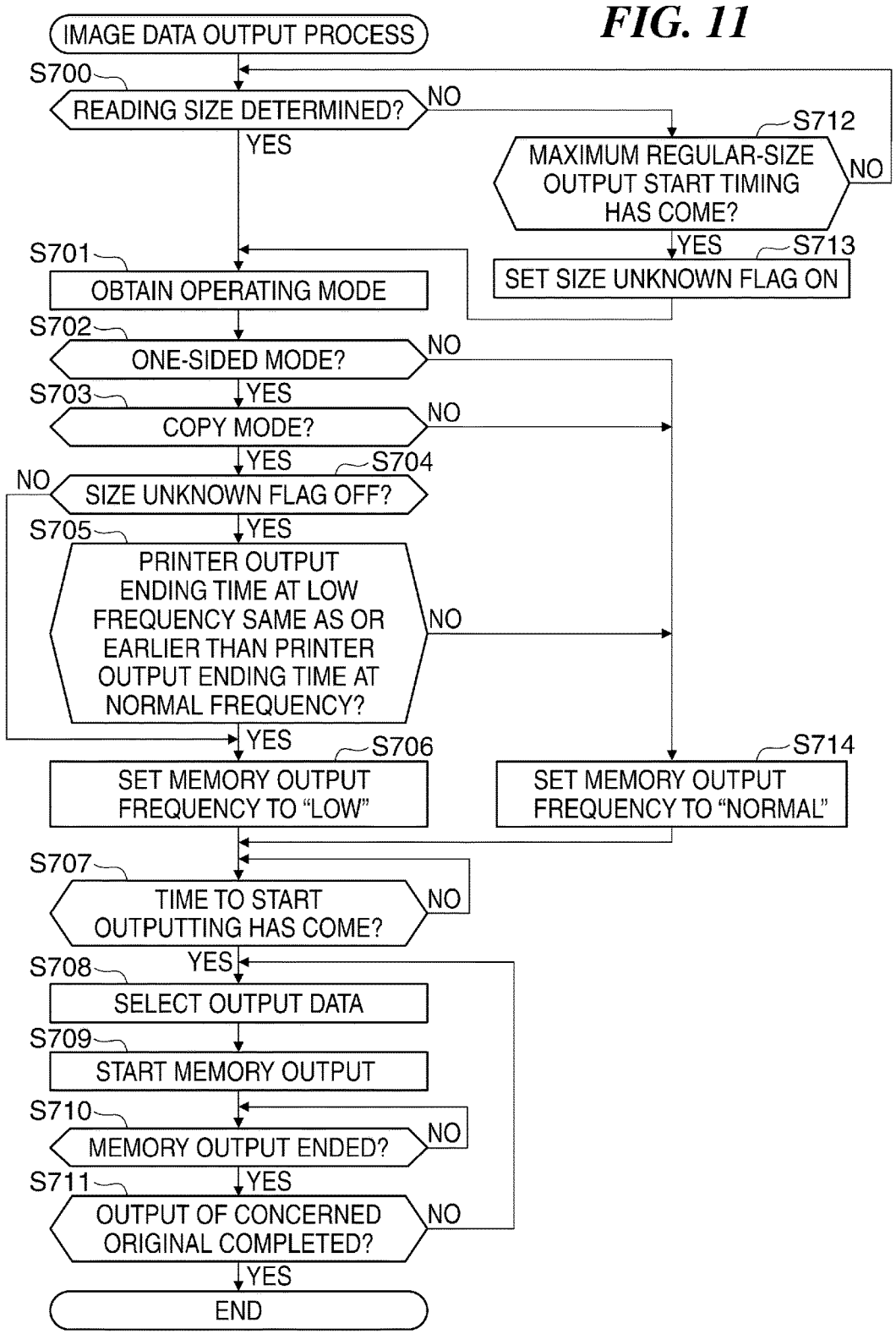
FIG. 11 is a flowchart showing the procedure of an image data output process according to the second embodiment in which image data stored in an image memory is output to a controller.

FIG. 11 is a flowchart showing the procedure of the image data output process according to the second embodiment in which image data stored in an image memory is output to a controller. This image data output process is carried out by a CPU (A) 551 of the reader control unit 550, which controls a reader 540, in accordance with a program stored in a ROM (A) 553.

When the image data output process is started, the CPU (A) 551 judges whether or not a reading size of an original P has been determined (step S700). The reading size is determined in the manner described with reference to the step S604 in FIG. 6 showing the above embodiment. As a result of the judgment in the step S700, when the reading size has been determined ("YES" in the step S700), the CPU (A) 551 obtains an operating mode designated by, for example, a user (step S701). An operating mode may be designated by a user through an operating unit 704 of the controller 700 or designated using an application or the like through a PC or the like.

On the other hand, when the CPU (A) 551 judges in the step S700 that the reading size has not been determined ("NO" in the step S700), the process proceeds to step S712. Specifically, the CPU (A) 551 judges whether or not the time to output an original of a maximum regular size allowed to be placed on the original tray 30 at a memory output frequency of 30 MHz size has come. As a result of the judgment in the step S712, when the time has come ("YES" in the step S712), the CPU (A) 551 judges that the size of the original could not be determined before the time, the process proceeds to the step S713. Specifically, the CPU (A) 551 sets a reading size unknown flag ON (step S713), and the process then proceeds to the step S701. On the other hand, when the CPU (A) 551 judges in the step S712 that the time has not come ("NO" in the step S712), the process returns to the step S700.

Then, after obtaining the operating mode in the step S701, the CPU (A) 551 judges whether or not the designated operating mode is a one-sided mode (step S702). As a result of the judgment in the step S702, when the designated operating mode is the one-sided mode ("YES" in the step S702), the CPU (A) 551 judges whether or not the designated operating mode is a copy mode (step S703). As a result of the judgment in the step S703, when the designated operating mode is the copy mode ("YES" in the step S703), the CPU (A) 551 judges whether or not the reading size unknown flag is OFF (step S704).

As a result of the determination in the step S704, when the reading size unknown flag is OFF ("YES" in the step S704), the process proceeds to step S705, S706, or S714, in which the CPU (A) 551 in turn carries out a memory output frequency determination process.

A description will now be given of the memory output frequency determination process which is carried out in the step S705, S706, or S714. In the memory output frequency determination process, the CPU (A) 551 obtains output ending times for a case where image data is output from the image memory (A) 560 at a low frequency (30 MHz) and a case where image data is output from the image memory (A) 560 at a normal frequency (40 MHz). The CPU (A) 551 then compares the output ending times thus obtained and a printer output ending time of the printer 600, and according to a result of the comparison, determines which memory output frequency to adopt.

The printer output ending time of the printer 600 is obtained by the printer information obtaining unit 581 of the reader control unit 500 via the controller 700. It should be noted that the printer output ending time of the printer 600 may also be obtained by holding in advance a list of printer output time periods of the printer 600 in respective operating modes and calculating a time period for a concerned operating mode among them.

FIGS. 12A to 12D are timing charts showing a variety of processes for operating modes according to the second embodiment. It should be noted that in FIGS. 12A to 12D, a time period for which image processing is performed by the controller 700 and a time period for which image data is output from the controller 700 to the printer 600 are omitted for the sake of convenience.

FIG. 12A is a timing chart for a one-sided mode in which the printer speed is low. Specifically, the operating mode in FIG. 12A is a mode in which as with a regular-size mode, a reading size is determined "before" a reading operation is started, and the output speed of the printer 600 is "lower" than an output speed of memory output at a low memory output frequency (30 MHz).

Referring to FIG. 12A, the start timing of printer output is earlier in a case where memory output is started with a memory output frequency set to 30 MHz (t2 in FIG. 12A) than in a case where memory output is started at 40 MHz. Printer output is finished more quickly due to the advancement of the printer output starting timing (t7 in FIG. 12A). Thus, in this case, the result of the judgment by the CPU (A) 551 in the step S705 is "YES", and hence the process proceeds to step S706, in which the CPU (A) 551 in turn sets the memory output frequency to "Low (30 MHz)".

FIG. 12B is a timing chart for a one-sided mode in which the printer speed is high. Specifically, the operating mode in FIG. 12B is a mode in which as with a regular-size mode, a reading size is determined "before" a reading operation is started, and the output speed of the printer 600 is "higher" than an output speed of memory output at a normal memory output frequency (40 MHz).

Referring to FIG. 12B, in memory output with a memory output frequency set to 30 MHz, memory output is started with timing t2 in FIG. 12B, and in memory output with a memory output frequency set to 40 MHz, memory output is started with timing t3 in FIG. 12B. Because the printer output speed is higher than the memory output speed, the start timing of image formation by the printer 600 is adjusted by the controller 700. As a result, the start timing of printer output is timing t4 in FIG. 12B in either case, and the printer output ending time as well is t6 in FIG. 12B in either case. Thus, in this case, the result of the judgment by the CPU (A) 551 in the step S705 is "YES", and hence the process proceeds to the step S706, in which the CPU (A) 551 in turn sets the memory output frequency to "Low (30 MHz)".

FIG. 12C is a timing chart in a case where a reading size is determined "after" a reading operation is started, and the primer speed is low. Specifically, the operating mode in FIG. 12C is a mode in which as with an irregular-size mode, a reading size is determined "after" a reading operation is started, and the output speed of the printer 600 is "lower" than an output speed of memory output at a low memory output frequency (30 MHz).

Referring to FIG. 12C, the start timing of image formation is earlier in a case where memory output is started with a memory output frequency set to 30 MHz (timing t3 in FIG. 12C) than in a case where memory output is started at 40 MHz (timing t4 in FIG. 12C). Printer output is finished more quickly due to the advancement of the starting timing of image formation (t5 in FIG. 12C). Thus, in this case, the result of the judgment in the step S705 is "YES", and hence the process proceeds to the step S706, in which the CPU (A) 551 in turn selects a "Low (30 MHz)" memory output frequency from candidate memory output frequencies.

FIG. 12D is a timing chart in a case where a reading size is determined "after" a reading operation is started, and the primer speed is high. Specifically, the operating mode in FIG. 12D is a mode in which as with an irregular-size mode, a reading size is determined "after" a reading operation is started, and the output speed of the printer 600 is "higher" than an output speed of memory output at a normal memory output frequency (40 MHz).

Referring to FIG. 12D, in memory output with a memory output frequency set to 30 MHz, memory output is started with timing t3 in FIG. 12D, and in memory output with a memory output frequency set to 40 MHz, memory output is started with timing t4 in FIG. 12D. However, because the printer output speed is higher than the memory output speed, the start timing of image formation by the printer 600 is adjusted by the controller 700.

However, the printer output time period is the same irrespective of which output frequency is set, and hence at either output frequency, a printer output ending time is a time at which memory output is completed. Thus, the end timing of printer output is earlier (t7 in FIG. 12D) in a case where memory output is started at a memory output frequency of 40 MHz than in a case where memory output is started at 30 MHz. Thus, in this case, the result of the judgment by the CPU (A) 551 in the step S705 is "NO", and hence the process proceeds to step S714, in which the CPU (A) 551 in turn sets the memory output frequency to "Normal (40 MHz)".

Referring again to FIG. 11, processes in steps S707 to S711 are the same as the steps S605 to S609 in FIG. 6, and hence description thereof is omitted.

On the other hand, when the CPU (A) 551 judges in the step S704 that the reading size unknown flag is not OFF but ON ("NO" in the step S704), the process proceeds to step S706. When the reading size unknown flag is ON, both an image data output ending time and a printer output time are unknown. For this reason, comparative judgment in the step S705 is impossible. However, by starting memory output from the image memory (A) 560 with a memory output frequency set to 30 MHz, completion of printer output is not delayed unlike the case where image data is always output at 40 MHz in either one of patterns with printer speeds in FIG. 12A or FIG. 12B. Thus, the CPU (A) 551 assumes that a present reading size is a maximum regular size allowed to be placed on the tray, and the process proceeds to the step S706.

At this time, when a size of an original is found after the judgment in the step S704, memory output frequencies may be changed to output image data again. For example, a printer output ending time corresponding to a memory output ending time under present conditions and a printer output ending time in a case where image data is output again at a normal frequency are compared with each other, and when it is found that printer output is completed earlier in the latter case, it is preferred that memory output frequencies are changed to output image data again.

When the CPU (A) 551 judges in the step S702 that the operating mode is not the one-sided mode ("NO" in the step S702), the process proceeds to the S714. Also, when the CPU (A) 551 judges in the step S703 that the operating mode is not the copy mode ("NO" in the step S703, the process proceeds to the S714.

According to the process in FIG. 11, to temporarily store read mage data in the image memory (A) 560 and then output the image data to the controller 700, an output frequency is determined using information on a printer output ending time as well. This achieves optimum FCOT suitable for an operation mode.

FIG. 13 is a diagram showing memory output frequencies set for original sizes in the operating modes according to the present embodiment. As is apparent from FIG. 13, in the one-sided copy mode, a lower memory output frequency than that in the double-sided copy mode is used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-169179, filed Aug. 28, 2015, which is hereby incorporated by reference herein in its entirety.

What is claimed is:

1. An image forming apparatus comprising:
   a tray on which an original is placed;
   a conveyor configured to convey the original placed on the tray;
   a first reader configured to read a first side of the original being conveyed;
   a second reader configured to read a second side of the original being conveyed, a reading position of the second reader being disposed on a conveying path downstream of the first reader;
   a memory configured to store image data output from the first and second readers; and
   a printer configured to form an image on a recording medium based on the image data stored in the memory,
   wherein a first memory output frequency in a first mode, where one side of an original is read and an image is formed on one side of a recording medium, is lower than a second memory output frequency in a second mode, where both sides of an original are read and an image is formed on both sides of a recording medium, and
   wherein a time period in the first mode, from when starting storing the image data from the first reader in the memory to when starting outputting the image data from the memory while continuously reading the first side, is shorter than a time period in the second mode, from when starting storing the image data from the first reader in the memory to when starting outputting the image data from the memory while continuously reading the first side.

2. The image forming apparatus according to claim 1, wherein in the first mode, in a case where a size of the original is a regular-size, the first memory output frequency is set lower than that in a case where a size of the original is an irregular-size.

3. The image forming apparatus according to claim 1, further comprising:
   an image processor configured to perform image processing to the image data; and
   a processor configured to determine timing with which transfer of the image data from the memory to the image processor is started,
   wherein the processor determines timing with which the transfer is started so that the transfer of the image data to the image processor becomes completed after storage of the image data in the memory is completed.

4. The image forming apparatus according to claim 3, wherein the processor determines the timing with which the transfer of the image data is started based on a size of the original.

5. The image forming apparatus according to claim 4, wherein when the size of the original is an irregular-size, the size of the original is judged to be a maximum regular size set in the image forming apparatus.

6. The image forming apparatus according to claim 1, wherein the first and second memory output frequencies are set higher than a memory writing frequency with which the image data is written in the memory.

7. The image forming apparatus according to claim 1, further comprising:
   a processor configured to obtain information on the printer,
   wherein each of the first and second memory output frequencies is set based on the information.

8. The image forming apparatus according to claim 7, wherein the information on the printer is an image formation speed or an image formation ending time of the printer.

9. The image forming apparatus according to claim 1, wherein in the second mode, the printer is configured to form an image corresponding to the second side of the original before forming an image corresponding to the first side of the original on the recording medium.

* * * * *